(12) United States Patent
Sakata

(10) Patent No.: US 10,463,955 B2
(45) Date of Patent: Nov. 5, 2019

(54) INFORMATION PROCESSING DEVICE, INFORMATION PROCESSING METHOD, PROGRAM, AND INFORMATION STORAGE MEDIUM

(71) Applicant: SONY INTERACTIVE ENTERTAINMENT INC., Tokyo (JP)

(72) Inventor: Masaaki Sakata, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 285 days.

(21) Appl. No.: 15/303,785

(22) PCT Filed: Jan. 5, 2015

(86) PCT No.: PCT/JP2015/050038
§ 371 (c)(1),
(2) Date: Oct. 13, 2016

(87) PCT Pub. No.: WO2015/162942
PCT Pub. Date: Oct. 29, 2015

(65) Prior Publication Data
US 2017/0036108 A1 Feb. 9, 2017

(30) Foreign Application Priority Data

Apr. 25, 2014 (JP) ................. 2014-090963

(51) Int. Cl.
*A63F 13/285* (2014.01)
*G06F 3/01* (2006.01)
(Continued)

(52) U.S. Cl.
CPC .......... *A63F 13/285* (2014.09); *A63F 13/497* (2014.09); *A63F 13/655* (2014.09);
(Continued)

(58) Field of Classification Search
CPC .... A63F 13/285; A63F 13/497; A63F 13/655; A63F 13/86
(Continued)

(56) References Cited

U.S. PATENT DOCUMENTS

| | | | | |
|---|---|---|---|---|
| 2001/0016518 | A1* | 8/2001 | Nishiumi | A63F 13/06 463/36 |
| 2004/0056840 | A1* | 3/2004 | Goldenberg | A63F 13/06 345/156 |

(Continued)

FOREIGN PATENT DOCUMENTS

| | | |
|---|---|---|
| JP | 2006-261836 A | 9/2006 |
| JP | 2006-326371 A | 12/2006 |

(Continued)

OTHER PUBLICATIONS

International Preliminary Report on Patentability dated Nov. 3, 2016, from the corresponding PCT/JP2015/050038.

(Continued)

*Primary Examiner* — Jay Trent Liddle
*Assistant Examiner* — Ryan Hsu
(74) *Attorney, Agent, or Firm* — Katten Muchin Rosenman LLP

(57) ABSTRACT

To provide an information processing device, an information processing method, a program, and an information storage medium that make it possible to reproduce vibration of a controller according to conditions of execution of a program. A play time vibration control section (44) performs control to vibrate a controller according to conditions of execution of a program. A capture control section (46) performs control to capture a moving image showing executed contents of the program. An associating section (48) associates vibration information indicating a vibration of the controller with at least part of the captured moving (Continued)

image, the at least part of the captured moving image being associated with an image displayed on a display section in timing in which the controller is controlled to vibrate.

7 Claims, 8 Drawing Sheets

(51) Int. Cl.
*A63F 13/655* (2014.01)
*A63F 13/497* (2014.01)
*A63F 13/86* (2014.01)
*G11B 27/11* (2006.01)

(52) U.S. Cl.
CPC .............. *A63F 13/86* (2014.09); *G06F 3/016* (2013.01); *G11B 27/11* (2013.01)

(58) Field of Classification Search
USPC .......................................................... 463/31
See application file for complete search history.

(56) References Cited

U.S. PATENT DOCUMENTS

| | | | | |
|---|---|---|---|---|
| 2006/0046843 | A1* | 3/2006 | Nakajima | A63F 13/00 463/30 |
| 2007/0218994 | A1* | 9/2007 | Goto | A63F 13/06 463/36 |
| 2007/0279392 | A1* | 12/2007 | Rosenberg | A63F 13/10 345/173 |
| 2009/0118008 | A1 | 5/2009 | Kobayashi et al. | |
| 2013/0198334 | A1 | 8/2013 | Ikenaga et al. | |
| 2013/0314354 | A1* | 11/2013 | Heubel | G06F 3/016 345/173 |
| 2014/0044351 | A1 | 2/2014 | Ito | |

FOREIGN PATENT DOCUMENTS

| | | |
|---|---|---|
| JP | 2012-85823 A | 5/2012 |
| JP | 2014-36329 A | 2/2014 |

OTHER PUBLICATIONS

International Search Report and Written Opinion dated Mar. 31, 2015, from the corresponding PCT/JP2015/050038.

* cited by examiner

| START TIMING | END TIMING | LEFT VIBRATION STRENGTH | RIGHT VIBRATION STRENGTH |
|---|---|---|---|
| 00:04:03 | 00:04:06 | 128 | 128 |
| 00:06:23 | 00:06:28 | 64 | 192 |
| 00:08:12 | 00:08:18 | 128 | 64 |
| 00:10:46 | 00:10:52 | 64 | 64 |

INFORMATION PROCESSING DEVICE, INFORMATION PROCESSING METHOD, PROGRAM, AND INFORMATION STORAGE MEDIUM

TECHNICAL FIELD

The present invention relates to an information processing device, an information processing method, a program, and an information storage medium.

BACKGROUND ART

There is a technology that captures a moving image showing executed contents of a program, such as a moving image showing play contents of a game (see PTL 1, for example).

The thus captured moving image is for example stored in a device that executes the program. The device is then made to reproduce the moving image. Thereby an image displayed and a sound output when the program was executed can be reproduced.

The thus captured moving image may also be uploaded to an image disclosure site or distributed by live streaming, for example. Suppose for example that the device on a transmitting side captures the moving image showing the executed contents of the program, and transmits the moving image to a device on a receiving side. In this case, the device on the receiving side is made to reproduce the moving image. Thereby an image displayed and a sound output when the device on the transmitting side executed the program can be reproduced by the device on the receiving side.

There is also a technology that vibrates a controller according to conditions of execution of a program such for example as a game program.

CITATION LIST

Patent Literature

[PTL 1]
U.S. Patent Application Publication No. 2009/0118008

SUMMARY

Technical Problem

The conventional technologies can reproduce an image displayed and a sound output when a program was executed, as described above, but cannot reproduce vibration of a controller according to conditions of execution of the program.

The present invention has been made in view of the above problem. It is an object of the present invention to provide an information processing device, an information processing method, a program, and an information storage medium that make it possible to reproduce vibration of a controller according to conditions of execution of a program.

Solution to Problem

In order to solve the above problem, according to the present invention, there is provided an information processing device including: a vibration control section configured to perform control to vibrate a controller according to conditions of execution of a program; a capture control section configured to perform control to capture a moving image showing executed contents of the program; and an associating section configured to associate vibration information indicating a vibration of the controller with at least part of the moving image, the at least part of the moving image being associated with an image displayed on a display section in timing in which the controller is controlled to vibrate.

In addition, according to the present invention, there is provided an information processing method including: a step of performing control to vibrate a controller according to conditions of execution of a program; a step of performing control to capture a moving image showing executed contents of the program; and a step of associating vibration information indicating a vibration of the controller with at least part of the moving image, the at least part of the moving image being associated with an image displayed on a display section in timing in which the controller is controlled to vibrate.

In addition, according to the present invention, there is provided a program for making a computer perform: a step of performing control to vibrate a controller according to conditions of execution of a program; a step of performing control to capture a moving image showing executed contents of the program; and a step of associating vibration information indicating a vibration of the controller with at least part of the moving image, the at least part of the moving image being associated with an image displayed on a display section in timing in which the controller is controlled to vibrate.

In addition, according to the present invention, there is provided a computer readable information storage medium storing a program for making a computer perform: a step of performing control to vibrate a controller according to conditions of execution of a program; a step of performing control to capture a moving image showing executed contents of the program; and a step of associating vibration information indicating a vibration of the controller with at least part of the moving image, the at least part of the moving image being associated with an image displayed on a display section in timing in which the controller is controlled to vibrate.

In addition, according to the present invention, there is provided another information processing device including: a moving image obtaining section configured to obtain a moving image associated with vibration information indicating timing of vibrating a controller; a reproducing section configured to reproduce the moving image; and a vibration control section configured to perform control to vibrate the controller in the timing indicated by the vibration information associated with the moving image while the moving image is reproduced.

In addition, according to the present invention, there is provided another information processing method including: a step of obtaining a moving image associated with vibration information indicating timing of vibrating a controller; a step of reproducing the moving image; and a step of performing control to vibrate the controller in the timing indicated by the vibration information associated with the moving image while the moving image is reproduced.

In addition, according to the present invention, there is provided another program for making a computer perform: a step of obtaining a moving image associated with vibration information indicating timing of vibrating a controller; a step of reproducing the moving image; and a step of performing control to vibrate the controller in the timing indicated by the vibration information associated with the moving image while the moving image is reproduced.

In addition, according to the present invention, there is provided another computer readable information storage medium storing a program for making a computer perform: a step of obtaining a moving image associated with vibration information indicating timing of vibrating a controller; a step of reproducing the moving image; and a step of performing control to vibrate the controller in the timing indicated by the vibration information associated with the moving image while the moving image is reproduced.

In one mode of the present invention, the vibration information is associated with the moving image, as information disposed in a frame image constituting the moving image, and while the moving image is reproduced, the controller is controlled to vibrate when the frame image in which the vibration information is disposed is displayed.

In this mode, the vibration information may be associated with the moving image, as information disposed in a region occupying part of the frame image constituting the moving image, and while the moving image is reproduced, the controller may be controlled to vibrate when it is detected that the vibration information is disposed within the region occupying the part of the frame image being displayed.

In addition, in one mode of the present invention, the vibration information is associated with the moving image, as a photographed image obtained by photographing a user executing the program, the photographed image being disposed in a frame image constituting the moving image, and while the moving image is reproduced, the vibration of the controller is controlled according to the photographed image occupying part of the frame image being displayed.

In this mode, the program may be a program of a game that allows a plurality of users to participate in the game as players, the vibration information may be associated with the moving image, as photographed images obtained by photographing the respective plurality of users participating in the game as players, the photographed images being disposed in the frame image constituting the moving image, and while the moving image is reproduced, the vibration of the controller may be controlled according to the photographed images occupying part of the frame image being displayed.

In addition, in one mode of the present invention, the vibration information indicates a vibrator to be vibrated and a strength of vibration of the vibrator.

In addition, in one mode of the present invention, the vibration information associated with the moving image when the moving image is distributed to another device is different from the vibration information associated when the moving image is stored in the information processing device.

In addition, according to the present invention, there is provided yet another information processing device including: a vibration information obtaining section configured to obtain vibration information indicating a vibration of a controller, the vibration information being output according to conditions of execution of a program; an output information generating section configured to generate output information indicating an output corresponding to a type of an output device on a basis of the obtained vibration information; and an output control section configured to perform control so that the output device performs the output according to the generated output information.

In addition, according to the present invention, there is provided yet another information processing method including: a step of obtaining vibration information indicating a vibration of a controller, the vibration information being output according to conditions of execution of a program; a step of generating output information indicating an output corresponding to a type of an output device on a basis of the obtained vibration information; and a step of performing control so that the output device performs the output according to the generated output information.

In addition, according to the present invention, there is provided yet another program for making a computer perform: a step of obtaining vibration information indicating a vibration of a controller, the vibration information being output according to conditions of execution of a program; a step of generating output information indicating an output corresponding to a type of an output device on a basis of the obtained vibration information; and a step of performing control so that the output device performs the output according to the generated output information.

In addition, according to the present invention, there is provided yet another computer readable information storage medium storing a program for making a computer perform: a step of obtaining vibration information indicating a vibration of a controller, the vibration information being output according to conditions of execution of a program; a step of generating output information indicating an output corresponding to a type of an output device on a basis of the obtained vibration information; and a step of performing control so that the output device performs the output according to the generated output information.

DESCRIPTION OF EMBODIMENT

One embodiment of the present invention will hereinafter be described in detail with reference to the drawings.

Figure 1:
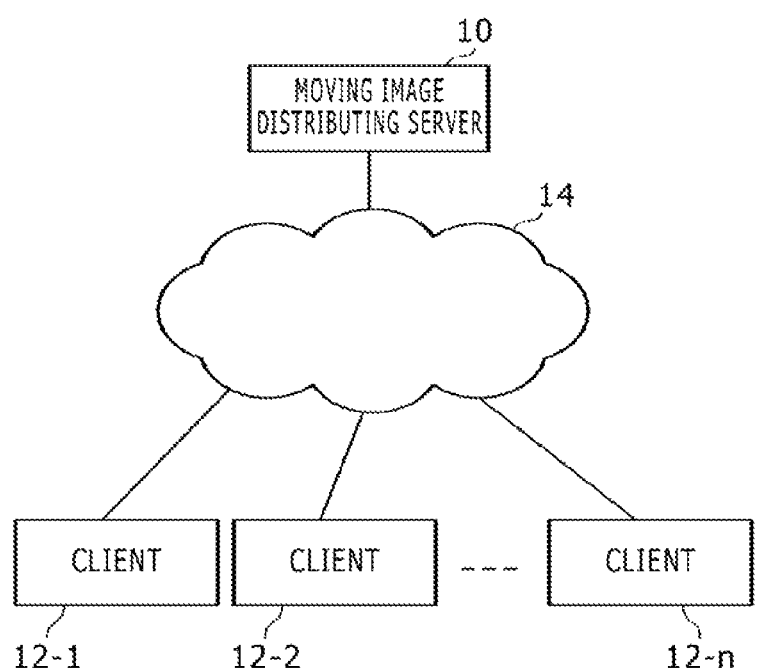
FIG. 1 is a diagram depicting an example of a general configuration of a moving image sharing system according to one embodiment of the present invention.

FIG. 1 is a diagram depicting an example of a general configuration of a moving image sharing system 1 according to one embodiment of the present invention. As depicted in FIG. 1, the moving image sharing system 1 according to the present embodiment includes a moving image distributing server 10 and a client 12 (12-1, 12-2, . . . , and 12-n), which are each configured centering on a computer. The moving image distributing server 10 and the client 12 are connected to a computer network 14 such as the Internet. Then, the moving image distributing server 10 and the client 12 can communicate with each other.

The moving image distributing server 10 is a server computer for storing a moving image transmitted from the client 12 and distributing the moving image to the client 12. The moving image distributing server 10 sends and receives data to and from the client 12 via the computer network 14, for example.

Figure 2:
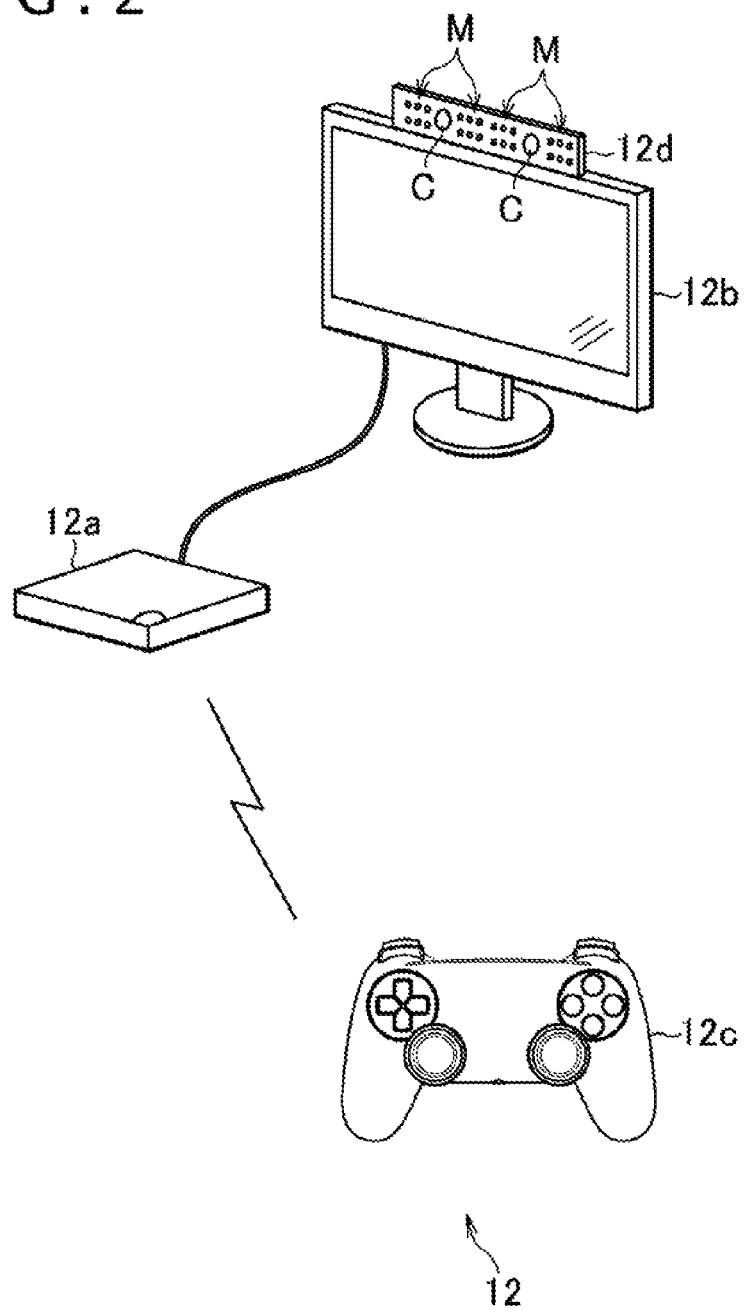
FIG. 2 is a diagram depicting an example of a configuration of a client according to one embodiment of the present invention.

The client 12 is an information processing device used by a user of the client 12. In the present embodiment, as depicted in FIG. 2, for example, the client 12 includes a game console 12a, a display 12b, a controller 12c, and a camera and microphone unit 12d. Incidentally, the client 12 does not need to be the one depicted in FIG. 2, but may be for example a personal computer, a television receiver, a portable game device, a portable information terminal, or the like.

Figure 3:
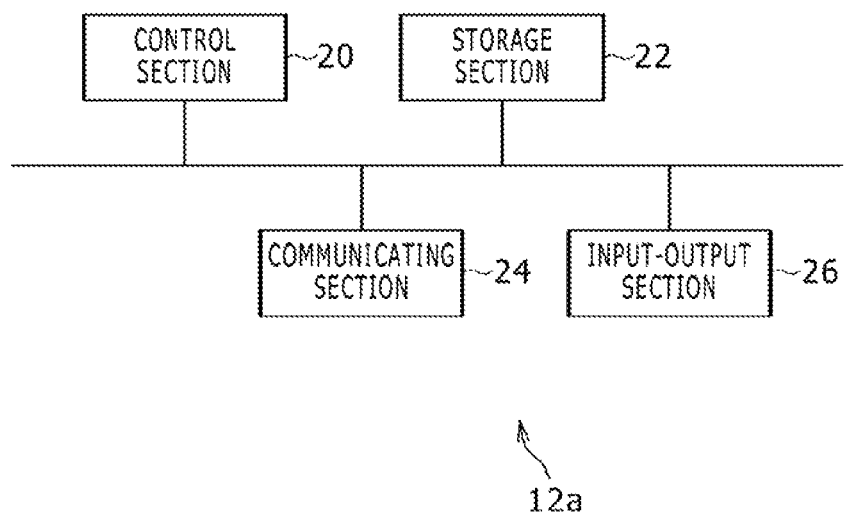
FIG. 3 is a diagram depicting an example of a hardware configuration of a game console according to one embodiment of the present invention.

In the present embodiment, as depicted in FIG. 3, for example, the game console 12a includes a control section 20, a storage section 22, a communicating section 24, and an input-output section 26. The control section 20 is for example a program control device such as a central processing unit (CPU) that operates according to a program installed on the game console 12a. The control section 20 according to the present embodiment also includes a graphics processing unit (GPU) that renders an image in a frame buffer on the basis of a graphics command and data supplied from the CPU. The storage section 22 is for example a storage element such as a read-only memory (ROM) and a random access memory (RAM), a hard disk drive and the like. The storage section 22 stores the program executed by the control section 20 and the like. In addition, the region of the frame buffer in which an image is rendered by the GPU is secured in the storage section 22 according to the present embodiment. The communicating section 24 is for example a communication interface such as a network board, a wireless local area network (LAN) module, or the like. The input-output section 26 is an input-output port such as a high-definition multimedia interface (HDMI) (registered trademark) port and a universal serial bus (USB) port.

The display 12b according to the present embodiment is a display section such as a liquid crystal display. The display 12b displays a screen generated by the game console 12a or the like. The display 12b according to the present embodiment also includes a speaker that outputs sound represented by audio data generated by the game console 12a. The game console 12a and the display 12b are for example connected to each other via an audiovisual (AV) cable, an HDMI cable, or the like.

The controller 12c according to the present embodiment is an operating input device for performing operating input to the game console 12a. The controller 12c according to the present embodiment is provided with operating elements such for example as buttons, a touch panel, an operating stick, and the like. The controller 12c according to the present embodiment also includes sensors such as a gyro sensor that detects angular velocity and an acceleration sensor that detects acceleration. The controller 12c according to the present embodiment also includes two vibrators, for example eccentric motors in the present embodiment, on a left side and a right side. Incidentally, the vibrators do not need to be eccentric motors, but may be for example voice coil motors or the like. In addition, the number of vibrators included in the controller 12c is not limited to two. For example, four vibrators may be respectively provided to an upper left, an upper right, a lower left, and a lower right of the controller 12c.

The controller 12c according to the present embodiment also has a USB port. The controller 12c is connected to the game console 12a by a USB cable. The controller 12c can thereby output input data to the game console 12a by wire via the input-output section 26. In addition, in the present embodiment, when the controller 12c and the game console 12a are connected to each other by a USB cable, the game console 12a can output a vibration strength signal indicating strengths at which to vibrate the vibrators to the controller 12c by wire via the input-output section 26. The controller 12c according to the present embodiment also includes a radio communication module or the like. Therefore the controller 12c is also able to output input data to the game console 12a by radio via the communicating section 24. In addition, in the present embodiment, when the controller 12c and the game console 12a are connected to each other by radio, the game console 12a can output the vibration strength signal to the controller 12c by radio via the communicating section 24.

In the present embodiment, the vibration strength signal indicating two values individually associated with the left and right vibrators, is transmitted from the game console 12a to the controller 12c. Each of the two values will hereinafter be referred to as a vibration strength value. In addition, the value of the vibration strength signal which value is associated with the left vibrator will be referred to as a left vibration strength value, and the value of the vibration strength signal which value is associated with the right vibrator will be referred to as a right vibration strength value. Suppose that the vibration strength values according to the present embodiment are an integer of 0 to 255. In this case, for example, when the controller 12c receives the vibration strength signal having a vibration strength value of zero, the vibrator does not vibrate. When the controller 12c receives the vibration strength signal having a vibration strength value of one or more, for example, the vibrator vibrates at a strength that is increased as the vibration strength value becomes larger. When the controller 12c receives the vibration strength signal having a vibration strength value of 255, the vibrator vibrates at a highest strength. Each of the two vibrators included in the controller 12c according to the present embodiment thus vibrates at a strength as one of 255 levels.

The camera and microphone unit 12d according to the present embodiment includes for example a camera C that outputs an image obtained by imaging a subject to the game console 12a and a microphone M that obtains ambient sound, converts the sound into audio data, and outputs the audio data to the game console 12a.

Figure 4:
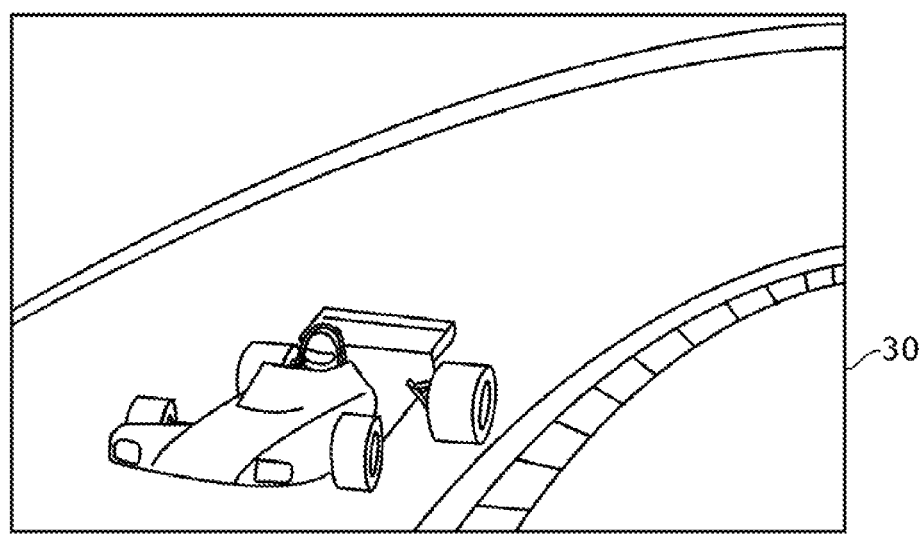
FIG. 4 is a diagram depicting an example of a play image.

Suppose in the present embodiment that, for example, a program such as the program of a game is installed on the game console 12a of the client 12-1. Then, suppose that a user of the client 12-1 executes the program of the game. Then, as depicted in FIG. 4, an image showing the executed contents of the program is generated, and is displayed on the display 12b. The image showing the executed contents of the program of the game will hereinafter be referred to as a play image 30. In the present embodiment, the play image 30 rendered in the frame buffer of the game console 12a is displayed on the display 12b. The displayed play image 30 is then updated at a predetermined frame rate. Suppose in the present embodiment that the play image 30 is updated at intervals of 1/60 of a second.

In addition, in the present embodiment, the game console 12a of the client 12-1 performs control to vibrate the controller 12c of the client 12-1 according to conditions of execution of the program. In the present embodiment, as described above, the game console 12a outputs the vibration strength signal to the controller 12c, and the controller 12c receives the vibration strength signal. Then, the controller 12c performs control to vibrate the vibrators included in the controller 12c with strengths corresponding to the vibration strength values of the vibration strength signal. Suppose in this case that, for example, the controller 12c of the client 12-1 vibrates when the play image 30 depicted in FIG. 4 is displayed.

In addition, in the present embodiment, the user performs a predetermined operation to thereby capture a play moving image constituted of a series of play images 30 displayed at a predetermined frame rate, as described above. In the present embodiment, for example, the capture of the play moving image displayed on the display 12b is started in response to a capture start operation performed by the user. The thus captured play moving image is encoded and stored in the storage section 22 of the game console 12a. Incidentally, the frame rate of the play moving image displayed on the display 12b and the frame rate of the captured play moving image may be different from each other. The capture of the play moving image is continued until the user performs a predetermined capture end operation. Hereinafter, the captured play image 30 will be referred to as a captured image 32 (see FIG. 5), and the captured play moving image will be referred to as a captured moving image. That is, the captured moving image includes a series of captured images 32 as frame images.

Figures 5, 6:
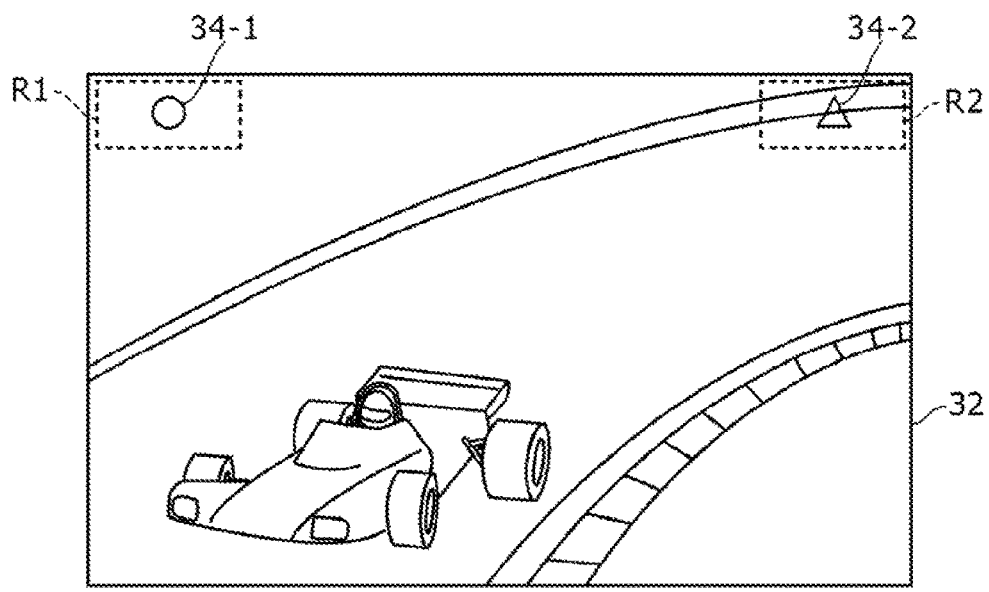
FIG. 5 is a diagram depicting an example of a captured image.
FIG. 6 is a diagram depicting an example of vibration information.

FIG. 5 is a diagram depicting an example of the captured image 32 stored in the storage section 22 by capturing the play image 30 depicted in FIG. 4. In the present embodiment, vibration information indicating the vibration of the controller 12c is associated with at least part of the captured moving image, the at least part of the captured moving image being associated with the play image 30 displayed on the display 12b in timing in which the controller 12c is vibrated. An example of the vibration information in the present embodiment is a vibration identifying image 34 illustrated in FIG. 5. In the present embodiment, for example, the vibration identifying image 34 is disposed in the captured image 32 generated by capturing the play image 30 displayed on the display 12b in timing in which the controller 12c is controlled to vibrate. Thus, in the present embodiment, part of the captured moving image and the vibration information are associated with each other by disposing the vibration identifying image 34 in the captured image 32. Thus, as information disposed in the captured image 32 as a frame image constituting the captured moving image, or as information disposed in a disposition region R occupying part of the captured image 32 in this case, the vibration information according to the present embodiment is associated with the captured moving image. Then, in the present embodiment, when the client 12-1 reproduces the captured moving image, for example, the controller 12c of the client 12-1 is controlled to vibrate in timing in which the frame image having the vibration identifying image 34 disposed therein is displayed. In the present embodiment, for example, the presence or absence of the vibration identifying image 34 is detected by performing shape analysis on the captured image 32 using a publicly known image analysis technology. Then, the controller 12c of the client 12-1 is controlled to vibrate in response to the detection of the vibration identifying image 34. Thus, in the present embodiment, the vibration of the controller 12c according to the conditions of execution of the program can be reproduced while the captured moving image is reproduced.

In the present embodiment, a position at which the vibration identifying image 34 is disposed is associated with the vibrator of the controller 12c. In the example of FIG. 5, the captured image 32 is provided with two disposition regions R as regions in which to dispose the vibration identifying image 34. Then, a first disposition region R1 occupying part of an upper left of the captured image 32 is associated with the left vibrator, and a second disposition region R2 occupying part of an upper right of the captured image 32 is associated with the right vibrator. Then, in the present embodiment, the left vibrator of the controller 12c vibrates when a circular vibration identifying image 34-1 is disposed in the first disposition region R1 within the displayed captured image 32. In addition, in the present embodiment, the right vibrator of the controller 12c vibrates when a triangular vibration identifying image 34-2 is disposed in the second disposition region R2 within the displayed captured image 32. Thus, in the present embodiment, while the captured moving image is reproduced, the controller 12c is controlled to vibrate when the captured image 32 having the vibration information disposed therein is displayed.

In addition, in the present embodiment, for example, the position at which the vibration identifying image 34 is disposed within the disposition region R is associated with a strength of vibration of the vibrator. Specifically, for example, the vibrator is controlled to vibrate with a strength that is increased as the vibration identifying image 34 is disposed closer to a lower right corner within the disposition region R. The vibration information according to the present embodiment thus indicates the vibrator to be vibrated and the strength of vibration of the vibrator.

It is to be noted that the object associated with the strength of vibration of the vibrator is not limited to the position at which the vibration identifying image 34 is disposed. For example, the size of the vibration identifying image 34 may be associated with the strength of vibration of the vibrator. In this case, for example, the vibrator is controlled to vibrate with a strength that is increased as the size of the vibration identifying image 34 becomes larger.

In addition, for example, the number of vibration identifying images 34 disposed in the disposition region R may be associated with the strength of vibration of the vibrator. In this case, for example, the vibrator is controlled to vibrate with a strength that is increased as the number of vibration identifying images 34 disposed in the disposition region R is increased.

In addition, for example, when the vibration identifying image 34 does not have a circular shape, the angle of the vibration identifying image 34 may be associated with the strength of vibration of the vibrator. In this case, for example, the vibrator is controlled to vibrate with a strength that is increased as an angle of inclination of the disposed vibration identifying image 34 with respect to a reference attitude becomes larger.

In addition, for example, the aspect ratio of the vibration identifying image 34 may be associated with the strength of vibration of the vibrator. In this case, for example, the vibrator is controlled to vibrate with a strength that is increased as the value of the aspect ratio of the vibration identifying image 34 disposed in the disposition region R becomes larger.

In addition, for example, when the contour of a figure disposed as the vibration identifying image 34 is broken lines, the number of broken lines may be associated with the strength of vibration of the vibrator. In this case, for example, the vibrator is controlled to vibrate with a strength that is increased as the number of broken lines as the contour of the vibration identifying image 34 is increased.

In addition, for example, the hue, saturation, lightness, or the like of the vibration identifying image 34 may be associated with the strength of vibration of the vibrator. In addition, for example, a state in which the vibration identifying image 34 is disposed and a state in which the vibration identifying image 34 is not disposed may be repeated at a predetermined frequency. Then, the vibrator may be controlled to vibrate with a strength that is increased as the frequency becomes lower, for example.

In addition, vibration identifying images 34 having a plurality of shapes may be disposed in one disposition region R. For example, the circular vibration identifying image 34-1 and the triangular vibration identifying image 34-2 may be disposed in the first disposition region R1. In this case, for example, the left vibrator included in the controller 12c vibrates when the circular vibration identifying image 34-1 is disposed in the first disposition region R1 within the displayed captured image 32. The right vibrator included in the controller 12c vibrates when the triangular vibration identifying image 34-2 is disposed in the first disposition region R1.

In addition, in the present embodiment, the above-described captured moving image is uploaded to the moving image distributing server 10 when the user performs a predetermined operation. In this case, suppose for example that the client 12-2 downloads, from the moving image distributing server 10, the captured moving image uploaded from the client 12-1 to the moving image distributing server 10, and reproduces the captured moving image. Then, the vibrator included in the controller 12c of the client 12-2 is controlled to vibrate when the vibration identifying image 34 is disposed in the displayed captured image 32. Thus, in the present embodiment, it is possible to reproduce the vibration of the controller 12c according to the conditions of execution of the program executed on the other client 12. Therefore a vibration experience is shared between different users.

Incidentally, the vibration identifying image 34 may be an icon indicating the controller 12c. Alternatively, a message indicating that the vibration can be reproduced by the controller 12c may be disposed in the captured image 32 in place of the vibration identifying image 34. This enables the user to recognize easily that the vibration can be reproduced by connecting the controller 12c.

In addition, the vibration information indicating the vibration of the controller 12c is not limited to the above-described vibration identifying image 34. For example, the captured image 32 may be generated by manipulating the edge of the play image 30 displayed on the display 12b in timing in which the controller 12c is controlled to vibrate. In this case, for example, when the captured image 32 is displayed, the vibrator may vibrate with a strength that is increased as an amount of change in lightness or saturation becomes larger. In addition, similarly, the captured image 32 may be generated by manipulating one side of the play image 30, a part of the side, a corner of the play image 30, or a central portion of the screen displayed on the display 12b in timing in which the controller 12c is controlled to vibrate. In addition, modes of the manipulation include for example a blur, three-primary-color division, a position shift, enlargement or reduction, and the like.

In addition, the vibration information does not need to be expressed as an image. For example, the vibration information may be data including start timing, end timing, a left vibration strength value, and a right vibration strength value as depicted in FIG. 6. In this case, the start timing indicates for example a time from a start of reproduction of the captured moving image to timing of starting the vibration of the vibrator. In addition, the end timing indicates for example a time from the start of the reproduction of the captured moving image to timing of starting the vibration of the vibrator. Alternatively, for example, the vibration information may be expressed as audio data. In addition, the vibration information may be included as part of a file of the captured moving image, or may be included in a file independent of the file of the captured moving image. Incidentally, when the vibration information is expressed in a form other than an image, the vibration can be reproduced irrespective of the resolution of the captured moving image.

In addition, for example, the vibration information may be associated with moving image contents such as a movie and a drama stored in the moving image distributing server 10 in advance rather than the captured moving image. Specifically, for example, the vibration identifying image 34 may be disposed in a frame image constituting the moving image contents. Then, the vibrator of the controller 12c may be controlled to vibrate as described above in timing in which the frame image having the vibration identifying image 34 disposed therein is displayed. For example, as a warning, or to raise expectations of a viewer, the vibration information may be associated by disposing for example the vibration identifying image 34 in a frame image immediately preceding a frame image of a scene that frightens the viewer, such as a scene in which a performer screams. In addition, for example, with an intention of notifying a scene in which a particular character appears, the vibration information may be associated by disposing for example the vibration identifying image 34 in a frame image of the scene or a frame image immediately preceding the frame image of the scene.

In addition, the client 12 displaying the captured moving image or the moving image contents in which the vibration identifying image 34 is disposed or the above-described manipulation is performed may not be provided with the controller 12c. Even in this case, the user viewing the captured moving image or the moving image contents can recognize visually that the vibration identifying image 34 represents timing of vibration by the above-described manipulation. Then, by configuring the client 12 so as to include the controller 12c, for example, the user can enjoy a richer user experience provided by the vibration of the vibrator of the controller 12c.

In addition, according to the present embodiment, the user viewing the above-described moving image on the device to which the controller 12c is not connected can be prompted to purchase the controller 12c and a device such as the game console 12a to which the controller 12c is connectable.

In addition, the client 12 that reproduces the moving image associated with the vibration information may store conversion rule data associating the vibration information with an output corresponding to a type of output device, a program identifying an output corresponding to a type of output device on the basis of the vibration information, or the like. Then, output information indicating the output corresponding to the type of output device may be generated by the conversion rule data or the program on the basis of the vibration information such as the vibration identifying image 34. Then, the output according to the output information may be output from the output device. This makes it possible to reproduce a suitable vibration according to the output device provided to the client 12 that reproduces the vibration of the controller 12c according to the conditions of execution of the program.

Here, for example, when the output device is a speaker, the output information indicates for example a volume. In addition, when the output device is lighting such as a light-emitting diode (LED) light, for example, the output information indicates for example an amount of light.

In addition, when the output device is the controller 12c, for example, the output information indicates for example the strength of the vibrator. Incidentally, in this case, the controller 12c provided to the client 12 that generates the vibration information and the controller 12c provided to the client 12 that performs the output according to the output information may be different from each other. For example, the controller 12c provided to the client 12 that generates the vibration information may include two vibrators, and the controller 12c provided to the client 12 that performs the output according to the output information may include four vibrators. In this case, the output information indicates vibration strength values for each of the four vibrators.

The association of vibration information with a moving image and the reproduction of vibration of the controller 12c according to the conditions of execution of the program, the association and the reproduction being performed by the game console 12a, will be further described in the following.

Figure 7:
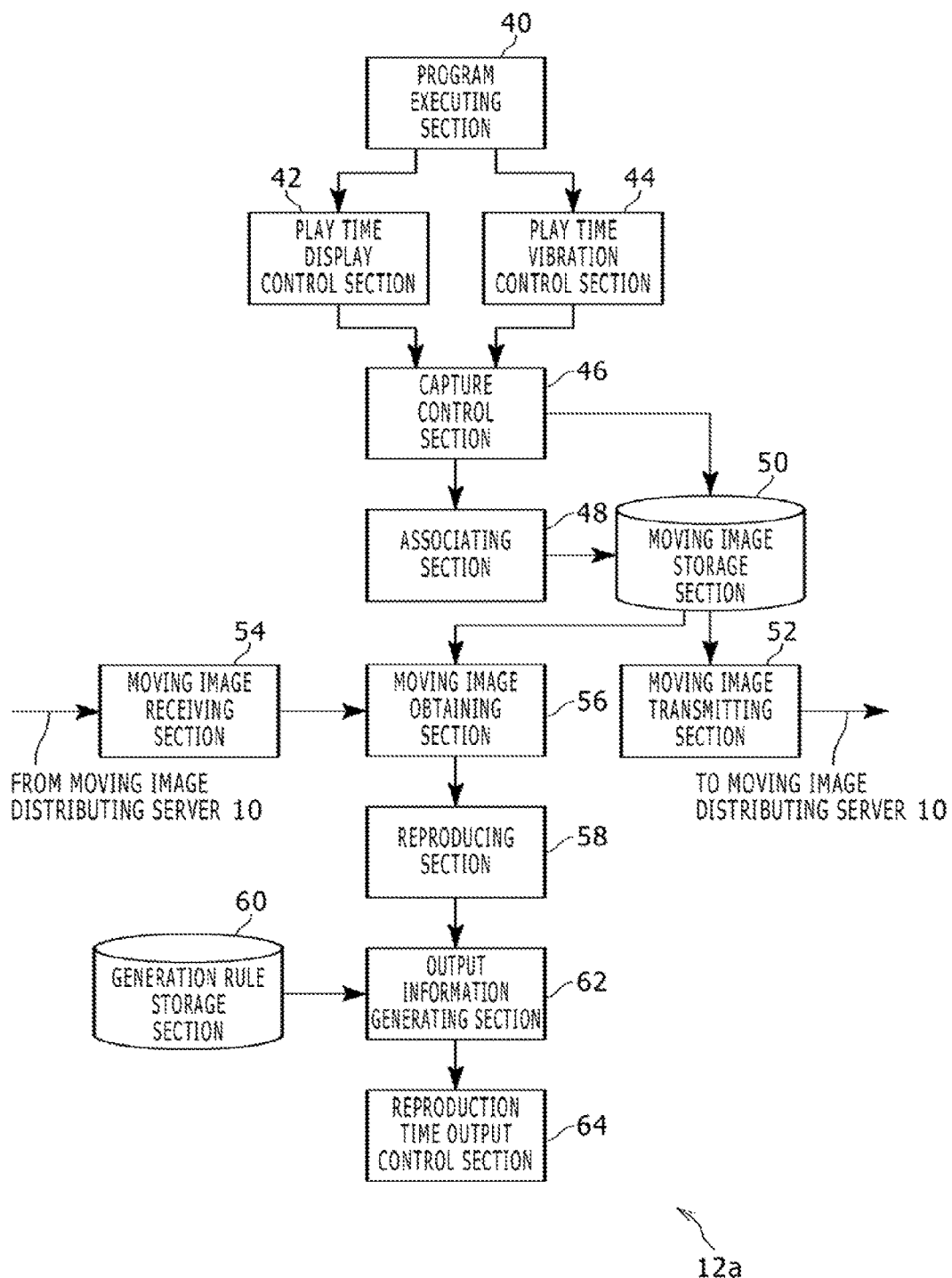
FIG. 7 is a functional block diagram depicting an example of functions implemented by the game console according to one embodiment of the present invention.

FIG. 7 is a functional block diagram depicting an example of functions implemented by the game console 12a according to the present embodiment, the functions being related to the association of vibration information with a moving image and the reproduction of vibration of the controller 12c according to the conditions of execution of the program, the association and the reproduction being performed by the game console 12a. Incidentally, the game console 12a according to the present embodiment does not need to implement all of the functions depicted in FIG. 7, and may implement functions other than the functions depicted in FIG. 7.

As depicted in FIG. 7, the game console 12a according to the present embodiment functionally includes for example a program executing section 40, a play time display control section 42, a play time vibration control section 44, a capture control section 46, an associating section 48, a moving image storage section 50, a moving image transmitting section 52, a moving image receiving section 54, a moving image obtaining section 56, a reproducing section 58, a generation rule storage section 60, an output information generating section 62, and a reproduction time output control section 64. The program executing section 40, the associating section 48, the moving image obtaining section 56, and the output information generating section 62 are implemented mainly in the control section 20. The play time display control section 42 and the reproducing section 58 are implemented mainly in the control section 20 and the input-output section 26. The play time vibration control section 44 and the reproduction time output control section 64 are implemented mainly in the communicating section 24 or the input-output section 26. The capture control section 46 is implemented mainly in the control section 20 and the storage section 22. The moving image storage section 50 and the generation rule storage section 60 are implemented mainly in the storage section 22. The moving image transmitting section 52 and the moving image receiving section 54 are implemented mainly in the communicating section 24.

Then, the above functions are implemented by executing, in the control section 20, a program including commands corresponding to the above functions, the program being installed on the game console 12a as a computer. This program is for example supplied to the game console 12a via a computer readable information storage medium such as an optical disk, a magnetic disk, a magnetic tape, a magneto-optical disk, or a flash memory, or via communicating means such as the Internet.

The game console 12a having the functions depicted in FIG. 7 has an aspect as a vibration information associating device that associates vibration information with a captured moving image. For example, the play time vibration control section 44, the capture control section 46, the associating section 48, the moving image storage section 50, and the moving image transmitting section 52 are the functions related to the aspect as the vibration information associating device. The game console 12a also has an aspect as a vibration reproducing device that performs control to vibrate the controller 12c according to the vibration information associated with the moving image while reproducing the moving image. For example, the moving image receiving section 54, the moving image obtaining section 56, the reproducing section 58, the output information generating section 62, and the reproduction time output control section 64 are the functions related to the aspect as the vibration reproducing device.

The program executing section 40 executes a program such as a game program.

The play time display control section 42 displays, on the display 12b, a play image 30 showing executed contents of the program such as the game program executed by the program executing section 40.

The play time vibration control section 44 performs control to vibrate the controller 12c according to the conditions of execution of the program such as the game program executed by the program executing section 40.

The capture control section 46 performs control to capture a moving image showing the executed contents of the program such as the game program. The capture control section 46 in the present embodiment for example captures a play moving image constituted of a series of play images 30 displayed on the display 12b.

The associating section 48 associates vibration information indicating vibration of the controller 12c with at least part of the moving image showing the executed contents of the program, the at least part of the moving image being associated with an image displayed on the display 12b in timing in which the controller 12c is controlled to vibrate. The associating section 48 in the present embodiment for example identifies, among the frame images constituting the captured moving image, a frame image associated with the play image 30 controlled to be displayed on the display 12b in the timing in which the controller 12c is controlled to vibrate. Then, the associating section 48 disposes a vibration identifying image 34 in the identified frame image. Incidentally, here, the associating section 48 may generate the captured image 32 by manipulating the play image 30 displayed on the display 12b in the timing in which the controller 12c is controlled to vibrate, as described above. In addition, the associating section 48 may generate the vibration information such as the data depicted in FIG. 6.

In addition, the associating section 48 may retain disposition region data indicating the position of a disposiregion R (R1 or R2) within the captured image 32. The disposition region data is for example data indicating the coordinate values of four vertexes of each disposition region R (R1 or R2). Then, the associating section 48 may identify the disposition region R (R1 or R2) on the basis of the disposition region data. Then, the vibration identifying image 34 may be disposed in the identified disposition region R (R1 or R2).

The moving image storage section 50 stores the captured moving image. In the present embodiment, for example, the associating section 48 generates the captured moving image by disposing the vibration identifying image 34 or performing the above-described manipulation in the play moving image, and stores the captured moving image in the moving image storage section 50. Incidentally, the associating section 48 may generate the vibration information depicted in FIG. 6, for example, and store the vibration information in the moving image storage section 50 in association with the captured moving image generated by the capture control section 46 by capturing the play moving image.

The moving image transmitting section 52 transmits the captured moving image in response to a request from the user. In the present embodiment, for example, the moving image transmitting section 52 transmits the captured moving image to the moving image distributing server 10. The captured moving image is stored in the moving image distributing server 10. Here, the moving image transmitting section 52 may directly transmit the captured moving image to another client 12.

The moving image receiving section 54 receives a moving image associated with vibration information, which moving image is an object of reproduction. The moving image receiving section 54 in the present embodiment for example receives a captured moving image stored in the moving image distributing server 10. Incidentally, the moving image receiving section 54 may receive a captured moving image transmitted from another client 12. In addition, the moving image receiving section 54 may receive moving image contents such as a movie or a drama associated with vibration information, the moving image contents being stored in the moving image distributing server 10.

The moving image obtaining section 56 obtains a moving image associated with vibration information, which moving image is an object of reproduction. The moving image obtaining section 56 in the present embodiment for example obtains the moving image received by the moving image receiving section 54 or the moving image stored in the moving image storage section 50. In addition, in the present embodiment, the moving image obtaining section 56 also has a role of a vibration information obtaining section that obtains vibration information indicating vibration of the controller 12c which vibration information is output according to the conditions of execution of the program.

The reproducing section 58 reproduces the moving image obtained by the moving image obtaining section 56.

The generation rule storage section 60 stores data or a program corresponding to a rule for generating output information indicating an output corresponding to a type of output device on the basis of the vibration information. Specifically, for example, the generation rule storage section 60 stores conversion rule data associating the vibration information with an output corresponding to a type of output device or a program identifying an output corresponding to a type of output device on the basis of the vibration information.

The output information generating section 62 generates output information on the basis of the data or the program stored in the generation rule storage section 60 and the vibration information associated with the moving image obtained by the moving image obtaining section 56. In this case, the output information generating section 62 for example detects the presence or absence of the vibration identifying image 34 by performing shape analysis on the disposition region R within the captured image 32 using a publicly known image analysis technology. Then, when detecting the vibration identifying image 34, the output information generating section 62 generates output information corresponding to the vibration identifying image 34.

The generation rule storage section 60 may also store the disposition region data indicating the position of the disposition region R (R1 or R2) within the captured image 32. The output information generating section 62 may then identify the disposition region R (R1 or R2) on the basis of the disposition region data. Then, the output information generating section 62 may detect the presence or absence of the vibration identifying image 34 by performing shape analysis on the identified disposition region R (R1 or R2) within the captured image 32. Thus, while the captured moving image is reproduced, the controller 12c may be controlled to vibrate when it is detected that the vibration information is disposed within the disposition region R occupying part of the displayed captured image 32.

The reproduction time output control section 64 performs control so that an output according to the output information generated by the output information generating section 62 is output from a predetermined output device. Here, when the output device is the controller 12c, for example, the reproduction time output control section 64 outputs a vibration strength signal according to the output information generated by the output information generating section 62 to the controller 12c. In this case, the reproduction time output control section 64 has a role of a vibration control section that performs control to vibrate the controller 12c in timing indicated by the vibration information associated with the captured moving image while the captured moving image is reproduced.

Figure 8:
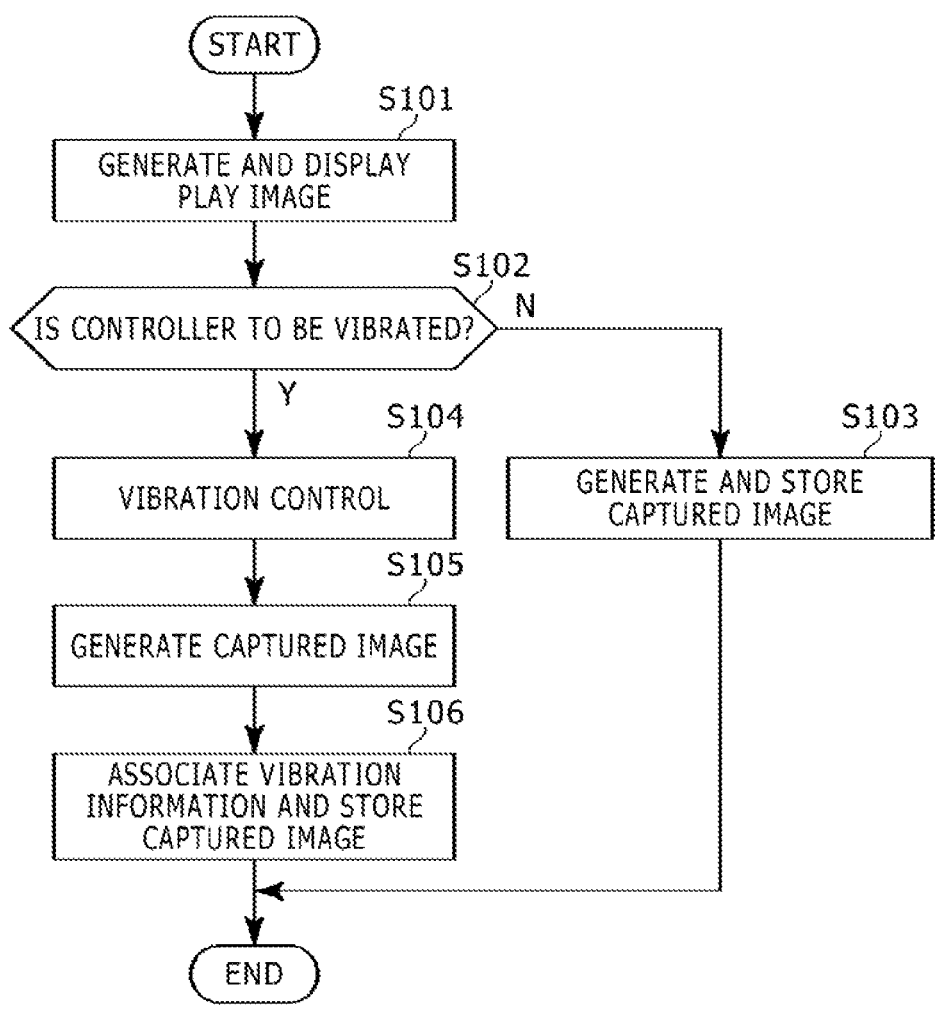
FIG. 8 is a flowchart depicting an example of a flow of processing performed by the game console according to the present embodiment.

An example of a flow of processing of generating a captured moving image and processing of associating vibration information with the captured moving image in a certain frame in the game console 12a according to the present embodiment will be described in the following with reference to a flowchart of FIG. 8. Suppose in the following that the program executing section 40 is executing a program such as a game program.

First, the play time display control section 42 generates a play image 30 showing executed contents of the program in the frame, and displays the play image 30 on the display 12b (S101). Then, the play time vibration control section 44 determines whether or not to vibrate the controller 12c in the frame according to the conditions of execution of the program (S102). When it is determined in the processing depicted in S102 that the controller 12c is not to be vibrated (S102: N), the capture control section 46 performs control to capture the play image 30 displayed in the processing depicted in S101 (S103). The processing illustrated in the present processing example is then ended. In the processing depicted in S103 in the present processing example, for example, the capture control section 46 generates a captured image 32 by capturing the play image 30 displayed in the processing depicted in S101, and stores the captured image 32 in the moving image storage section 50.

When it is determined in the processing depicted in S102 that the controller 12c is to be vibrated (S102: Y), on the other hand, the play time vibration control section 44 performs control to vibrate the controller 12c according to the conditions of execution of the program (S104). In the processing depicted in S104 in the present processing example, for example, a vibration strength signal in the frame is generated according to the conditions of execution of the program, and is output to the controller 12c. The controller 12c vibrates according to the received vibration strength signal. The capture control section 46 then performs control to capture the play image 30 displayed in the processing depicted in S101 (S105). In the processing depicted in S105 in the present processing example, for example, the capture control section 46 generates a captured image 32 by capturing the play image 30 displayed in the processing depicted in S101. Then, the associating section 48 associates vibration information with the captured image 32 generated in the processing depicted in S105, and stores the captured image 32 in the moving image storage section 50 (S106). In the processing depicted in S106 in the present processing example, for example, the associating section 48 disposes a vibration identifying image 34 corresponding to the vibration strength signal generated in the processing depicted in S104 in the captured image 32 generated in the processing depicted in S105. The associating section 48 then stores the captured image 32 in the moving image storage section 50. The processing illustrated in the present processing example is then ended.

Incidentally, the determination processing depicted in S102 may not be performed in the above processing example. Then, for example, even when the controller 12c is not vibrated, a vibration strength signal including a left vibration strength value of zero and a right vibration strength value of zero may be generated and output to the controller 12c. In addition, in this case, the associating section 48 may associate, with the captured image 32, vibration information associated with the vibration strength signal whose left vibration strength value and right vibration strength value are zero.

Figure 9:
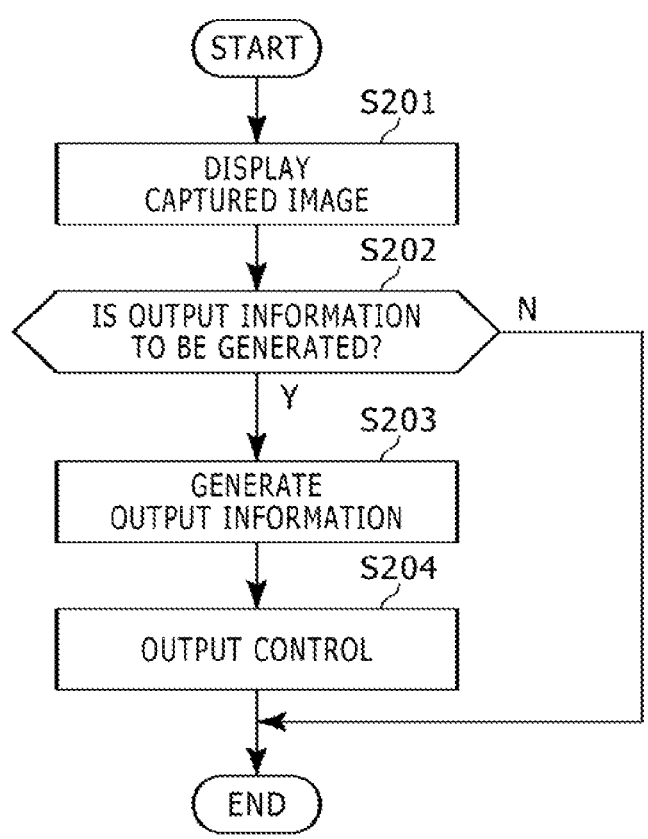
FIG. 9 is a flowchart depicting an example of a flow of processing performed by the game console according to the present embodiment.

Next, referring to a flowchart of FIG. 9, description will be made of an example of a flow of processing of displaying a captured image 32 as a frame image constituting a captured moving image and processing of controlling the vibration of the controller 12c in a certain frame in the game console 12a according to the present embodiment.

First, the reproducing section 58 displays the captured image 32 in the frame on the display 12b (S201). The output information generating section 62 then determines whether or not to generate output information on the basis of the data or the program stored in the generation rule storage section 60 and the frame image displayed in the processing depicted in S201 (S202). In this case, for example, when a vibration identifying image 34 is detected by performing shape analysis on a disposition region R within the captured image 32, it is determined that the output information corresponding to the vibration identifying image 34 is to be generated.

When it is then determined in the processing depicted in S202 that the output information is not to be generated (S202: N), the processing illustrated in the present processing example is ended. When it is determined that the output information is to be generated (S202: Y), on the other hand, the output information generating section 62 generates the output information on the basis of the data or the program stored in the generation rule storage section 60 and the frame image displayed in the processing depicted in S201 (S203). The reproduction time output control section 64 then performs control so that an output according to the output information generated in the processing depicted in S202 is output from a predetermined output device (S204). The processing illustrated in the present processing example is then ended. Here, when the output device is the controller 12c, for example, a vibration strength signal according to the output information generated by the output information generating section 62 is output to the controller 12c, and the controller 12c vibrates according to the vibration strength signal.

It is to be noted that the present invention is not limited to the foregoing embodiment.

Figure 10:
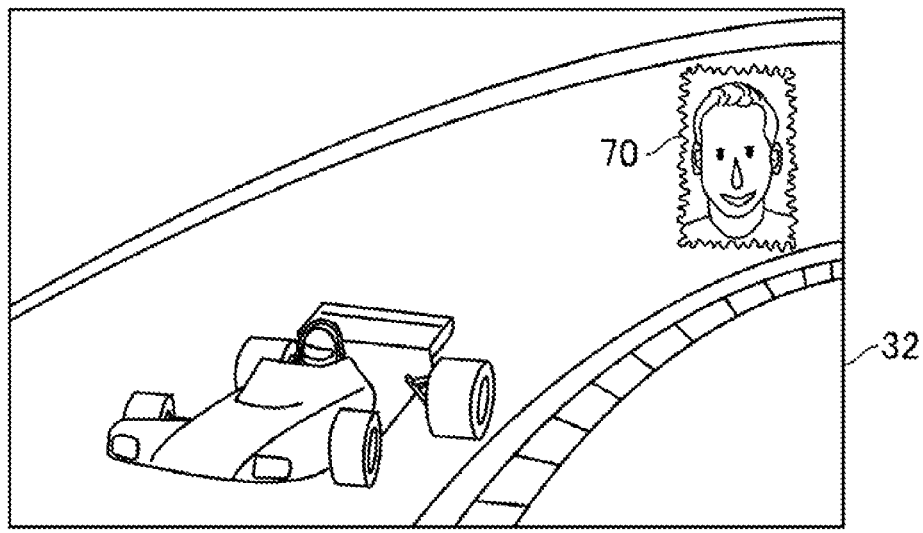
FIG. 10 is a diagram depicting an example of a captured image.

For example, during the play of the game, the camera C may photograph an image at a frame rate at which the play image 30 showing the executed contents of the program of the game is updated. Then, as depicted in FIG. 10, a captured image 32 constituting a captured moving image may be generated on the basis of the play image 30 showing the executed contents of the program of the game and a photographed image 70 photographed by the camera C during the play of the game. The photographed image 70 is disposed in a part of a region occupied by the play image 30 in the captured image 32 depicted in FIG. 10. In this case, the photographed image 70 is for example an image obtained by photographing the user by the camera C when the play image 30 is displayed on the display 12b. Incidentally, the captured image 32 may be an image formed by arranging the play image 30 and the photographed image 70 side by side.

Then, vibration information may be associated as the photographed image 70 with the captured moving image. That is, the controller 12c of the client 12 that reproduces the captured image 32 including the photographed image 70 may be controlled to vibrate in response to detection of the vibration information represented by the photographed image 70. The vibration information is thus transmitted as an image in a more natural form than the above-described vibration identifying image 34. In this case, for example, the above-described associating section 48 obtains the photographed image 70 illustrated in FIG. 10 which image is photographed by the camera C at a predetermined frame rate. The associating section 48 then generates a captured moving image including the captured image 32 illustrated in FIG. 10 on the basis of a play moving image captured by the capture control section 46 and a photographing moving image constituted of a series of photographed images 70.

A frame, for example, may be disposed on the periphery of the photographed image 70 disposed in the captured image 32 generated by capturing the play image 30 displayed on the display 12b in timing in which the controller 12c is controlled to vibrate. On the other hand, no frame may be disposed on the periphery of the photographed image 70 disposed in the captured image 32 generated by capturing the play image 30 displayed on the display 12b in timing in which the controller 12c is not controlled to vibrate. Then, for example, the client 12 that reproduces the captured image 32 including the photographed image 70 may detect the presence or absence of a frame disposed on the periphery of the photographed image 70 by performing shape analysis on the captured image 32 using a publicly known image analysis technology. Then, the controller 12c of the client 12 that reproduces the captured image 32 including the photographed image 70 may be controlled to vibrate in response to detection of the vibration identifying image 34. Thus, in the present embodiment, the vibration of the controller 12c according to the conditions of execution of the program can be reproduced while the captured moving image is reproduced.

In addition, for example, the thickness or color of the frame disposed on the periphery of the photographed image 70 disposed in the captured image 32 may be associated with the strength of vibration of the vibrator. In this case, for example, the vibrator of the controller 12c of the client 12 that reproduces the captured image 32 including the photographed image 70 is controlled to vibrate with a strength that is increased as the thickness of the frame disposed on the edges of the photographed image 70 is increased.

In addition, for example, the frame disposed on the periphery of the photographed image 70 may be controlled to vibrate (wave) with an amplitude or a frequency associated with the strength of vibration of the vibrator. The frame disposed on the periphery of the photographed image 70 illustrated in FIG. 10 is a frame in a vibrating state. Alternatively, for example, the whole of the photographed image 70 may be controlled to vibrate (wave) with an amplitude or a frequency associated with the strength of vibration of the vibrator. In this case, for example, the vibrator of the controller 12c of the client 12 that reproduces the captured image 32 including the photographed image 70 is controlled to vibrate with a strength corresponding to the photographed image 70.

In addition, for example, the size of a region in which the photographed image 70 is disposed may be associated with the strength of vibration of the vibrator. In this case, for example, the vibrator is controlled to vibrate with a strength that is increased as the region in which the photographed image 70 is disposed becomes larger.

In addition, for example, the inclination of the region in which the photographed image 70 is disposed may be associated with the strength of vibration of the vibrator. In this case, for example, the vibrator is controlled to vibrate with a strength that is increased as an angle of inclination of the region in which the photographed image 70 is disposed becomes larger.

In addition, for example, the position of the region in which the photographed image 70 is disposed may be associated with the strength of vibration of the vibrator. In this case, for example, the vibrator is controlled to vibrate with a strength that is increased as the region in which the photographed image 70 is disposed is disposed closer to a lower right corner.

In addition, for example, the color of the frame enclosing the region in which the photographed image 70 is disposed may be associated with the vibrator of the controller 12c. In this case, for example, the right vibrator included in the controller 12c may vibrate when a red frame encloses the region in which the photographed image 70 is disposed, and the left vibrator included in the controller 12c may be controlled to vibrate when a blue frame encloses the region in which the photographed image 70 is disposed.

In addition, for example, the above-described vibration identifying image 34 corresponding to the strength of vibration of the vibrator and the presence or absence of the vibration may be disposed within the photographed image 70.

Figure 11:
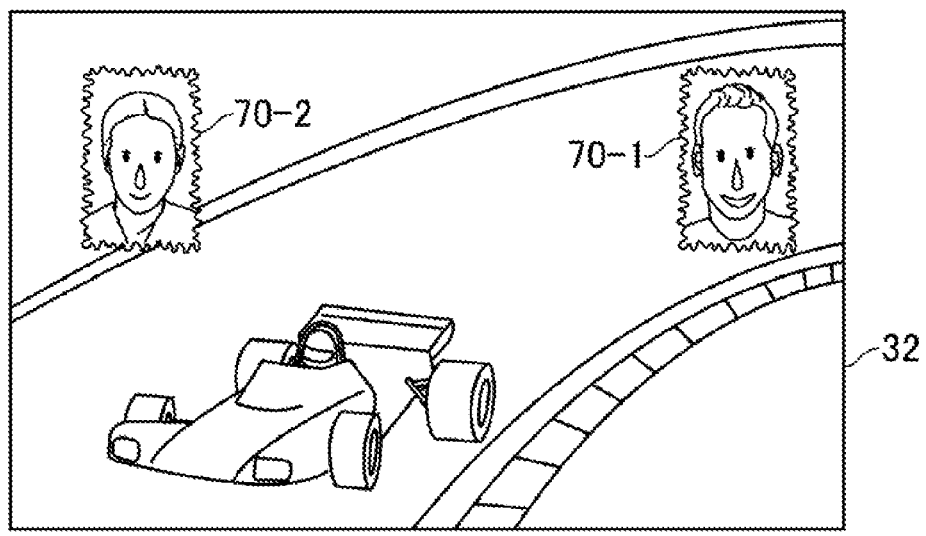
FIG. 11 is a diagram depicting an example of a captured image.

In addition, for example, as depicted in FIG. 11, as for a game in which a plurality of users participate as players, a captured image 32 may be generated on the basis of a play image 30 and a plurality of photographed images 70. In the captured image 32 depicted in FIG. 11, a photographed image 70-1 and a photographed image 70-2 are disposed in a part of a region occupied by the play image 30. Suppose for example that a user using the client 12-1 and a user using the client 12-2 are participating in the game as players. Then, suppose that a captured moving image including the captured image 32 is uploaded to the moving image distributing server 10 by the client 12-1. In this case, for example, the play image 30 depicted in FIG. 11 may be an image displayed on the display 12b provided to the client 12-1 during the play of the game. Then, the photographed image 70-1 depicted in FIG. 11 may be an image including an image of the user using the client 12-1, which image is photographed by the camera C provided to the client 12-1 when the play image 30 is displayed on the display 12b of the client 12-1. In addition, the photographed image 70-2 depicted in FIG. 11 may be an image including an image of the user using the client 12-2, which image is photographed by the camera C provided to the client 12-2 when the play image 30 is displayed on the display 12b of the client 12-1.

The photographed image 70-1 and the photographed image 70-2 may then have a role of vibration information, as described above. In this case, for example, the photographed image 70-1 is the vibration information indicating the vibration of the controller 12c provided to the client 12-1, and the photographed image 70-2 is the vibration information indicating the vibration of the controller 12c provided to the client 12-2. Then, in this case, the controller 12c of the client 12 that reproduces the captured image 32 may be controlled to vibrate in response to detection of the vibration information represented by at least one of the photographed image 70-1 or the photographed image 70-2.

In addition, for example, the client 12 may have a function of setting whether or not to reproduce vibration. In this case, when a setting is made so as not to reproduce vibration, for example, the vibration of the controller 12c is suppressed even when the captured image 32 in which the vibration identifying image 34 is disposed is displayed.

In addition, for example, while the captured moving image is generated by capturing the play moving image, the occurrence of a predetermined event in the program being executed may be detected. Then, vibration information indicating a time from timing of a start of the capture to timing of the occurrence of the event may be generated. Then, while the captured moving image is reproduced, the controller 12c may be controlled to vibrate when the time indicated by the vibration information has passed since a start of the reproduction. Thus, the vibration information indicating the vibration of the controller 12c does not need to be information indicating that the controller 12c was actually vibrated, but may be information indicating timing in which the controller 12c is controlled to vibrate, such as the timing of occurrence of a predetermined event, for example.

In addition, the vibration information does not need to be associated with moving image contents such as a captured moving image. For example, in a situation in which a program of a game is executed by a server, and a play image showing executed contents of the game is distributed to the client 12 and displayed, vibration information may be associated with the distributed play image. Specifically, for example, a vibration identifying image 34 may be disposed in the play image displayed in timing in which to vibrate the vibrator of the controller 12c. The vibrator of the controller 12c may then be controlled to vibrate when the play image 30 in which the vibration identifying image 34 is disposed is displayed on the display 12b.

In addition, vibration information does not need to be disposed in an image explicitly. For example, the controller 12c may be controlled to vibrate when it is detected by a publicly known image analysis technology that a captured image 32 indicates the occurrence of a predetermined event such for example as a collision between automobiles while a captured moving image is reproduced. In addition, for example, the controller 12c may be controlled to vibrate when it is detected by a publicly known sound analysis technology that a sound is output which sound indicates the occurrence of a predetermined event, such as a sound indicating a collision between automobiles while the moving image is reproduced.

In addition, captured moving images do not need to be transmitted and received via the moving image distributing server 10. For example, a captured moving image captured by the first client 12-1 may be transmitted to the second client 12-2 by a peer-to-peer system.

In addition, the present embodiment may be applied to a captured moving image distributed by live streaming. For example, the above-described vibration identifying image 34 and the above-described photographed image 70 may be disposed in a frame image constituting the captured moving image distributed by live streaming. Then, the controller 12c may be controlled to vibrate in timing indicated by vibration information associated with the captured moving image, such as timing in which the frame image having the vibration identifying image 34 disposed therein is displayed.

In addition, for example, vibration information associated with a captured moving image when the captured moving image is distributed to another client 12 may be different from vibration information associated when the captured moving image is stored in the client 12. For example, the vibration information when the captured moving image is stored and the vibration information when the captured moving image is uploaded to the moving image distributing server 10 may be different from each other. For example, the moving image storage section 50 may store the play moving image and the data illustrated in FIG. 6 which data represents vibration information. Suppose here that, for example, the client 12 receives a request to transmit the captured moving image from the user. In this case, in response to the reception of the transmission request, the associating section 48 may generate the captured moving image on the basis of the play moving image stored in the moving image storage section 50 and the data illustrated in FIG. 6. The captured moving image generated in this case may include a captured image 32 in which a vibration identifying image 34 is disposed as illustrated in FIG. 5, for example. The moving image transmitting section 52 may then transmit the generated captured moving image to the moving image distributing server 10.

In addition, the scope of application of the present embodiment is not limited to captured moving images and moving image contents distributed from the moving image distributing server 10. For example, the present embodiment may be applied to a moving image with which vibration information is associated, the moving image being stored in a storage device provided to the client 12. In addition, for example, the present embodiment may be applied to a moving image provided to the client 12 via a computer readable information storage medium such as an optical disk, a magnetic disk, a magnetic tape, a magneto-optical disk, or a flash memory. Specifically, for example, the above-described vibration identifying image 34 may be disposed in a frame image constituting the moving image stored in the storage device or the moving image provided via the information storage medium. Then, the controller 12c may be controlled to vibrate in timing indicated by the vibration information associated with the captured moving image, such as timing in which the frame image having the vibration identifying image 34 disposed therein is displayed.

In addition, the roles assigned to the game console 12a, the display 12b, and the controller 12c are not limited to the above-described roles. In addition, the game console 12a may be formed by a plurality of casings.

In addition, the above concrete character strings and the concrete character strings in the drawings are illustrative, and are not limited to these character strings.

The invention claimed is:

1. An information processing method comprising:
   recording a video of a video program executed by a player using a controller of an information processing device,
   wherein the user utilizes the controller to provide input to the information processing device during execution of the video game program;
   recording, simultaneously with the video, a vibration control recording comprising a vibration control signal output by the information processing device to the controller during execution of the video game program,
   associating each video frame of the video with a corresponding vibration control signal from the vibration control recording occurring at a same timing of the video frame;
   reproducing, on a display of an other information processing device, the video,
   wherein the corresponding control vibration signal, for each video frame of the video, is displayed as a vibration image in a portion of the frame as the video is reproduced;
   analyzing the vibration image for each video frame of the video as the video is reproduced to determine a control signal, and
   vibrating an other controller of the other information processing device in accordance with the control signal as the video is reproduced.

2. The information processing method according to claim 1,
   wherein a strength of the control signal output to the other controller is proportional to a size of the vibration image.

3. The information processing method according to claim 1,
   wherein a strength of the control signal output to the other controller is proportional to a position of the vibration image in the video frame.

4. The information processing method according to claim 1,
   wherein the vibration image is a frame surrounding a user video of the user recorded during execution of the video game program.

5. The information processing method according to claim 4,
   wherein a strength of the control signal output to the other controller is proportional to a pattern of the frame surrounding the user.

6. The information processing method according to claim 1,
   wherein the vibration control recording is stored separate from the video.

7. The information processing method according to claim 1,
   wherein a vibration control recording associated with the video when the video is reproduced on the other information processing device is different from the vibration control recording stored on the information processing device.

* * * * *